US012585825B2

(12) United States Patent
Bazarragchaa

(10) Patent No.: US 12,585,825 B2
(45) Date of Patent: Mar. 24, 2026

(54) DOCUMENT AUTHENTICITY VERIFICATION

(71) Applicant: Zorigt Bazarragchaa, Woodside, CA (US)

(72) Inventor: Zorigt Bazarragchaa, Woodside, CA (US)

( * ) Notice: Subject to any disclaimer, the term of this patent is extended or adjusted under 35 U.S.C. 154(b) by 123 days.

(21) Appl. No.: 17/822,894

(22) Filed: Aug. 29, 2022

(65) Prior Publication Data

US 2024/0070325 A1 Feb. 29, 2024

(51) Int. Cl.
*G06F 21/64* (2013.01)
*G06V 30/416* (2022.01)

(52) U.S. Cl.
CPC ............ *G06F 21/64* (2013.01); *G06V 30/416* (2022.01)

(58) Field of Classification Search
CPC .............................. G06F 21/64; G06V 30/416
See application file for complete search history.

(56) References Cited

U.S. PATENT DOCUMENTS

| | | | |
|---|---|---|---|
| 2013/0067237 A1* | 3/2013 | Huang | G06F 16/113 |
| | | | 713/189 |
| 2018/0046889 A1* | 2/2018 | Kapinos | G06F 16/93 |
| 2021/0075788 A1* | 3/2021 | Pasterk | H04L 9/3239 |
| 2021/0374395 A1* | 12/2021 | Tata | G06V 30/413 |

* cited by examiner

*Primary Examiner* — Farid Homayounmehr
*Assistant Examiner* — Brian William Avery
(74) *Attorney, Agent, or Firm* — Perkins Coie LLP; Colin Fowler; Ben Brokesh

(57) ABSTRACT

A technique for verifying information within a document id disclosed. The method comprises receiving two documents, a first document with known correct information and a second document for which the information needs to be verified. The method further comprises dividing each document into a series of corresponding regions based on the information found in each region. The method further comprises generating a hash value for each region through the use of a hashing algorithm. The method further comprises verifying the second document by comparing the hash values of each region to the corresponding hash values of the first document to verify that the two hash values are identical.

19 Claims, 7 Drawing Sheets

400

Identify a plurality of regions in a first document

401

Choose the desired regions based on what information needs to be verified

402

Generate a unique hash value for each chosen region

403

500

Generate a hash value of each region of a
second document

501

Compare the hash value of each region of the
first document to the corresponding hash value
of each region of a second document

502

Verify the second document if the hash value of
each region of the second document matches
the hash value of each corresponding region of
the first document

503

DOCUMENT AUTHENTICITY VERIFICATION

TECHNOLOGY FIELD

The present invention generally pertains to a technique for verifying the authenticity of a document.

BACKGROUND

Today, it is not uncommon to be asked to upload identification documents and a photo or short video to prove likeness, when opening a new account, such as a bank account or brokerage account. Consumers expect this process to be quick and simple, but accomplishing that can be challenging for financial organizations to do at scale. Often a team of staff is required to manually verify documents. This manual verification process involves visually comparing information and documents individually to see if they are correct. Not only is this time-consuming and prone to the risk of human error, but the cost to an organization of having a team dedicated to this task can also quickly add up and become unaffordable.

DETAILED DESCRIPTION

Introduced here is an improved method of document verification. A hashing algorithm is used to generate hash values for the document being verified and an additional document that contains known authentic information. The hash values of the two documents are compared and if the hash values match then the document passed the verification process and is deemed authentic. Individual portions of a document can be hashed so as to enable each of the individual portions to be separately verified.

Figure 1:
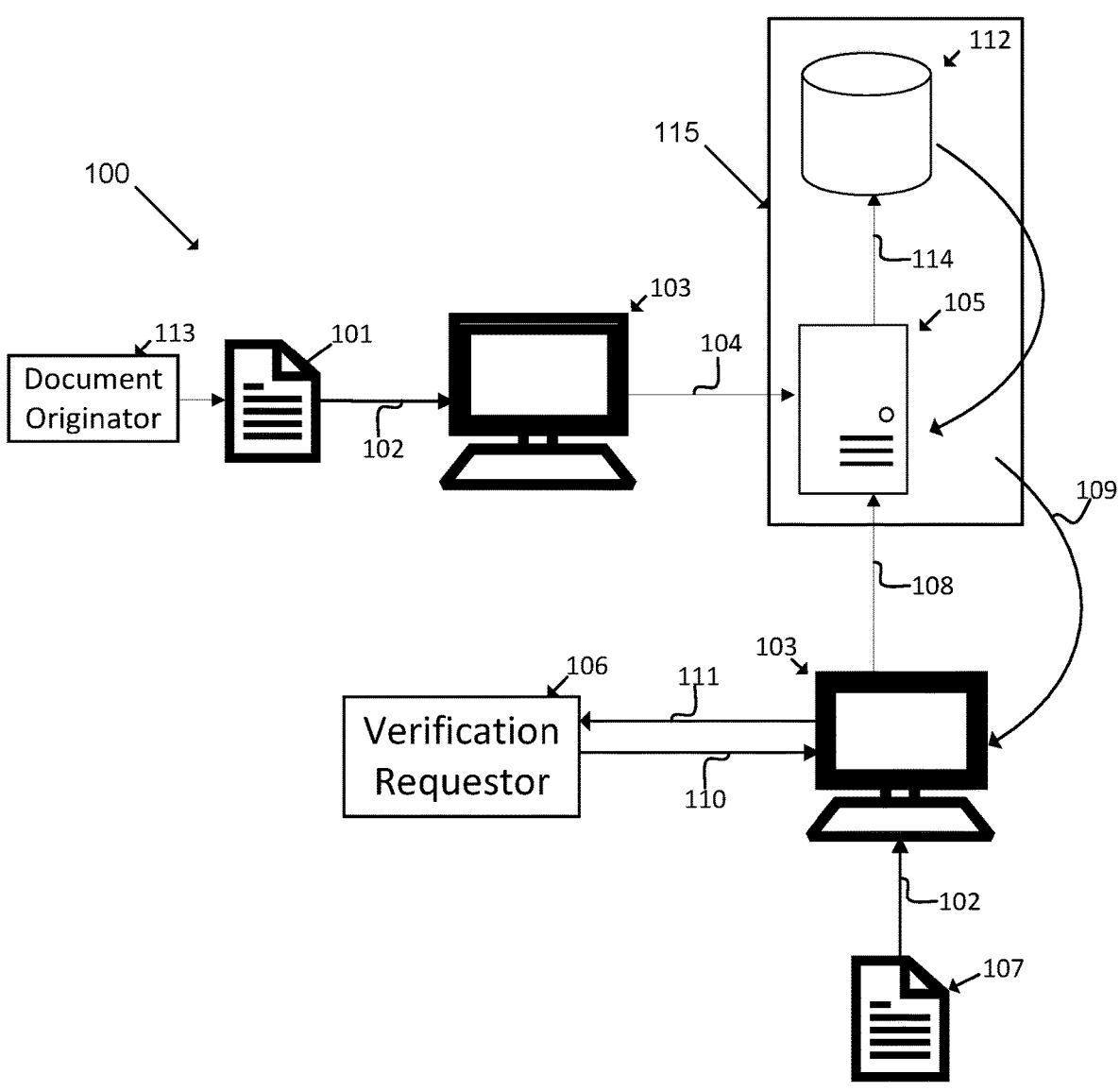
FIG. 1 illustrates a high-level example of how a verification requestor verifies a document.

FIG. 1 illustrates a high-level example of a verification method 100 according to the technique introduced here, and more particularly, what occurs once a verification requestor 106 makes a request to verify a document. Many different industries need to frequently verify information relating to the individuals with whom they do business. The entity (person or business enterprise) who requires such verification in the context of this technique and in FIG. 1 is the verification requestor 106. The method 100 is a solution that allows the verification requestor 106 to quickly and efficiently verify documents relating to the people with whom they do business. For example, a verification requestor 106 can be a bank, an employer, or a landlord. For example, the types of documents that may need to be verified can contain information such as addresses, incomes, names, dates of birth, social security numbers, and places of employment.

To begin the verification process, a server 105 receives a first document 101 from a document originator 113. In at least some embodiments, the server 105 executes a software application that performs the verification process. A document originator 113 is a third party who is known to have accurate records of a given individual's information that can be used for verification purposes. For example, a document originator can be a bank or an employer, where the types of documents that can be sent by document originator 113 may include a bank statement or pay stub, respectively. The document originator 113 sends the document 101 at step 102 to the server 105 through a user interface 103, which may be provided by a computer system owned or operated by the document originator 113. In some embodiments, the document 101 is uploaded to an online user interface on a web browser, a mobile application, or a desktop application via SDK, API, SFTP, FTP or any data transfer protocol. In other embodiments, the document originator 113 sends the document 101 to a specified email address associated with the verifier 115 using an email client via SMTP, POP and/or IMAP. The verifier 115 is a business entity that operates the server 105 and the database 112. The document 101 is uploaded at step 104 to the server 105 so that the document 101 can be used for verification purposes. At step 114 the document is saved to a database 112. Because the document is saved to the database 112 it does not need to be immediately used for verification purposes and can instead be kept until a verification request is received by the server 105.

After the document 101 has been uploaded to the server 105, the verification process can proceed. The verification requestor 106 submits a verification request 110 to the verifier 115 by using the user interface 103, which may be provided by a computer system owned or operated by the verification requestor 106. In some embodiments, the request is made using an online user interface on a web browser, a mobile application, or a desktop application via SDK, API, SFTP, FTP or any data transfer protocol. In other embodiments, the verification request 110 is made by sending a request to a specified email address associated with the verifier 115 by using an email client via SMTP, POP and/or IMAP. In connection with submitting a verification request 110, a second document 107 is sent to the server at step 102. The second document 107 contains information that is to be verified against the first document 101 and may be a purported copy of the first document 101 (determining whether it is a true copy is an objective of the verification process). In some embodiments, the second document 107 is sent by the verification requestor 106 at the time the verification request is made. In another embodiment, the second document 107 is sent by the individual whose information is being verified. The second document 107 can be sent to the server 105 in a similar manner to the first document 101 (e.g., through a web interface, mobile app, desktop app, email client, SDK, API, SFTP, FTP, SMTP, POP, IMAP or any data transfer protocol, etc.). The second document 107 is uploaded at step 108 to the server 105 where the document 107 is then verified against the first document 101. The server 105 can at least temporarily store the second document in memory (e.g., Random Access Memory, hard drive or solid-state drive) during the verification process.

The server 105 retrieves the first document 101 from the database 112 and compares it to the second document 107, to verify that the information in the second document 107 (or at least a specified portion of it) matches the information in the first document 101. The results 109 of the verification process are sent from the server 105 back to the user interface 103. The user interface 103 displays the results 109 of the verification process to the verification requestor 106 at step 111. The user interface 103 can display the results 109 as either passing the verification process or failing the verification process. Passing the verification process means the information in the first document and second document have been found to match by virtue of their corresponding hash values matching, i.e., the information in the second document is authentic. Failing the authentication process means the information in the first document and second document have been found not to match, i.e., the information in the second document is not authentic.

Figure 2:
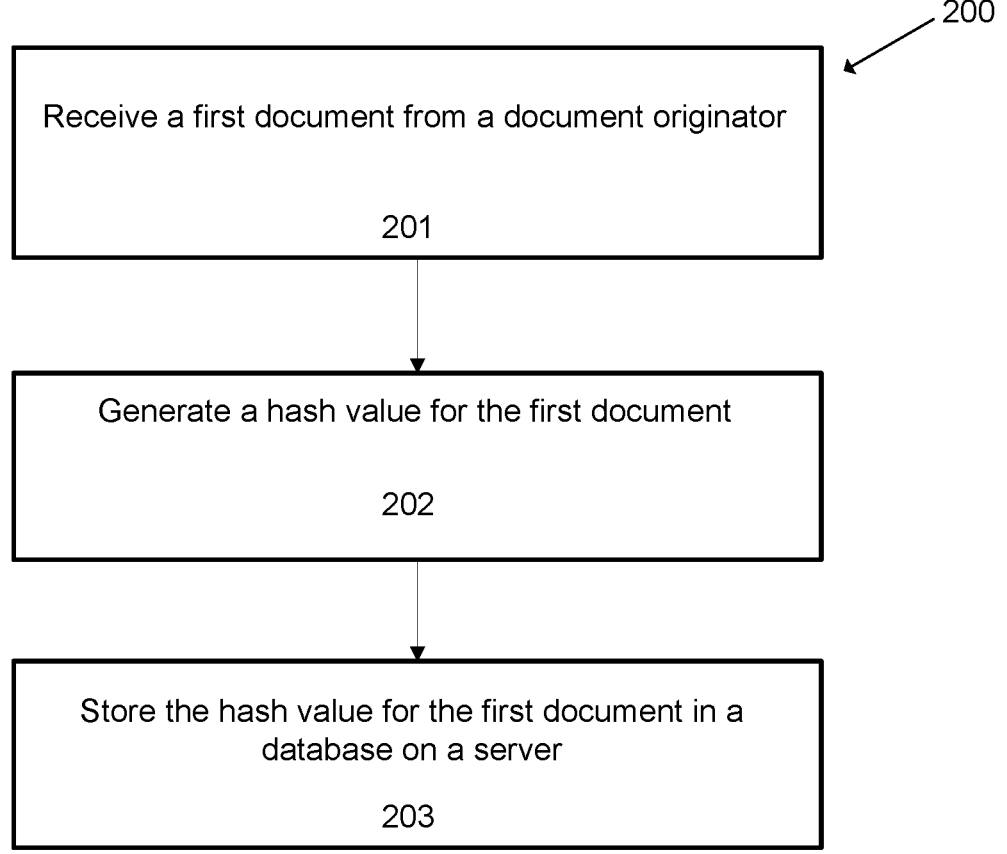
FIG. 2 is a high-level block diagram of a document verification process from the perspective of a document originator.

FIG. 2 shows a high-level example of the overall process 200 for verifying information in a digital document by using a hashing algorithm, such as may be performed by the server 105 in FIG. 1. Initially, at step 201 the verifier receives a first document from a document originator (e.g., via a computer network such as the Internet). The document originator can send the first document to the verifier before any information needs to be verified, which avoids the need to send the original document every time a verification request is made. The first document can be a digital document that contains personal information about an individual that would need to be verified for some purpose. For example, the first document can contain information such as addresses, income, name, date of birth, social security number, and place of employment.

At step 202 a server (e.g., server 105 from FIG. 1) generates a hash value for the first document. For example, the hash value can be generated based on the actual text (where "text" here means letters, numerals, and/or special characters) in the document and/or metadata in or associated with the document. A hashing algorithm generates the hash value. For example, the hashing algorithm can be SHA-256, SHA-512, MD6, FSB, or HAVAL. In some embodiments, the hashing algorithm used at step 202 is chosen by the verifier (e.g., verifier 115 in FIG. 1). In other embodiments, the hashing algorithm used at step 202 is automatically chosen from a pre-approved list of hashing algorithms. Hashing algorithms map data of an arbitrary size to a fixed-size value.

At step 203 the server saves the hash value generated for the first document to a database on the server (e.g., server 105 and database 112 in FIG. 1) so that it can be used in the verification process for a second document (e.g., a purported copy of the first document) at a later date. Because the hash value is stored in a database, the different hash values can be indexed, making the hash values searchable. Having searchable hash values allows the verifier to efficiently find the first document in the database, so that the first document can be used to verify multiple documents beyond just the second document.

In another embodiment, the server stores the hash value and other relevant identification information on a blockchain ledger instead of or in addition to storing it in a database. A blockchain ledger is a method of recording and storing information on a series of blocks after a suitable authentication process has occurred and has been approved by designated network participants. Each network participant maintains a copy of the current blockchain ledger making it very difficult to alter. A blockchain ledger can be a private or public ledger. For example, the hash value for a document or a portion thereof can be retrieved from the blockchain ledger for the verification technique described herein using the blockchain address or an identifier such as a block wallet identification number.

In some embodiments, where the verification requestor does not already have access to the second document, it may be desirable to keep the second document confidential, so that the verification requestor never gains access to the document as part of the verification process. The document can stay confidential from the verification requestor because the verification is performed by a third party, namely, the verifier. Hence, a verification requestor only needs to be informed that the second document has passed verification. Not revealing documents like social security cards to verification requestors, allows verification of these documents to be performed with less risk of the information being compromised.

Figure 3:
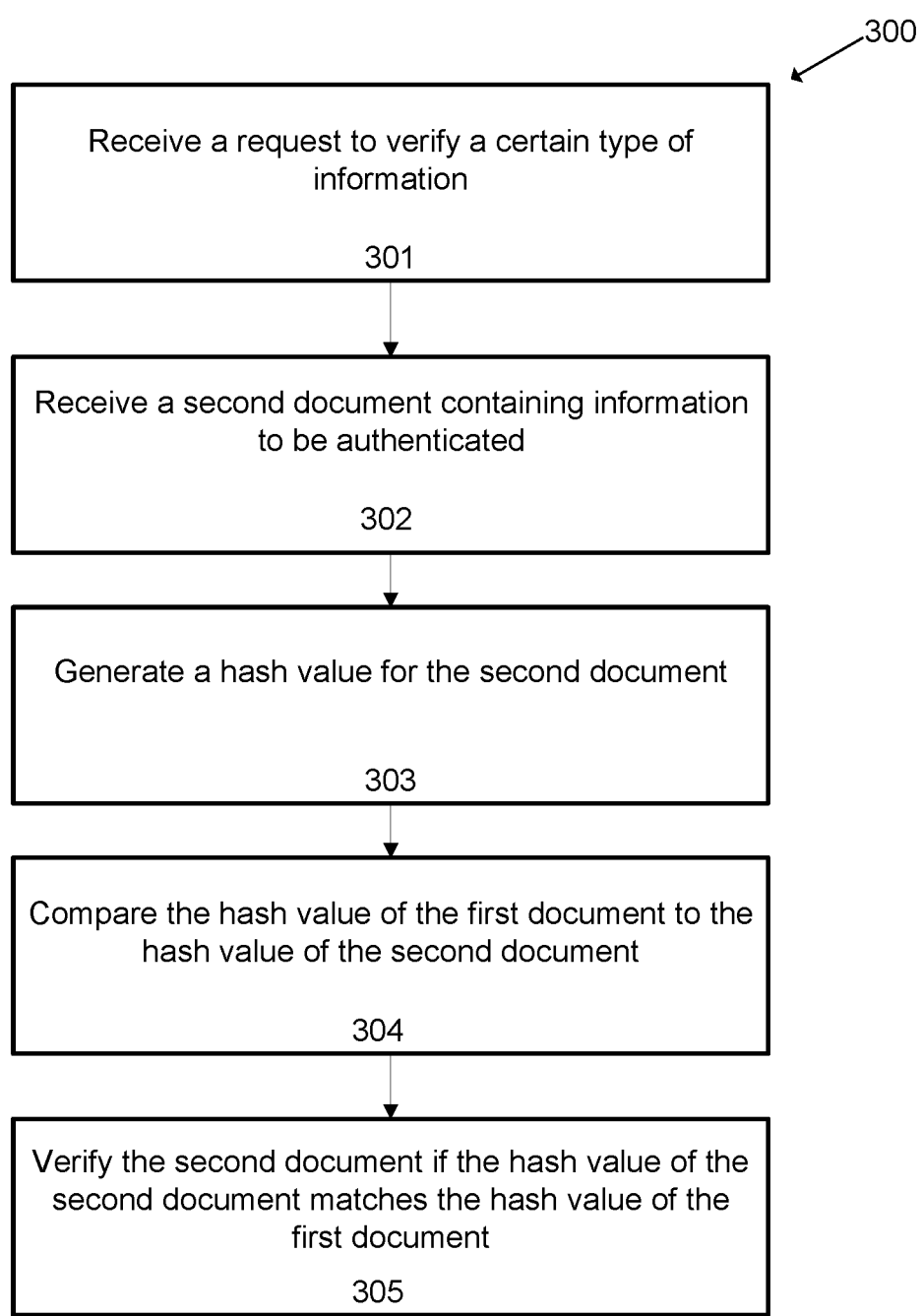
FIG. 3 is a high-level block diagram of a document verification process from the perspective of a verification requestor.

FIG. 3 shows a high-level example of the overall process 300 for verifying information in a digital document ("second document") (e.g., document 107 in FIG. 1) by using a hashing algorithm, such as may be performed by the server 105. At step 301 a verification requestor submits a request to the verifier 115 for a certain document to be verified. The verification request may originate from a computer system operated by the verification requestor or the person whose information is to be verified. At step 302, which can be a part of step 301, the server 105 receives a second document, which is the document to be verified. The second document can be sent by the verification requestor or by the individual whose information is to be verified. At step 303 the server 105 generates a hash value for the second document, based on text and/or metadata in the second document. The hash value is generated using the same hashing algorithm used to create the hash value of the first document described above in the context of FIG. 2. In some embodiments, the hash value for the second document is saved to a database on a server, so that it can be searched for in a similar way to the first hash value. In another embodiment, in the same manner, as described above, the hash value of the second document is saved to a blockchain ledger. At step 304 the server 105 compares the hash value of the second document to the hash value of the first document. At step 305 the server verifies the second document if the hash value of the second document matches the hash value of the first document. If the two hash values match, then the server notifies the verification requester that the second document passed the verification step 305 and is authentic. If the two hash values do not match, then the server notifies the verification requester that the second document failed the verification step 305, i.e., is not authentic.

Figure 4:
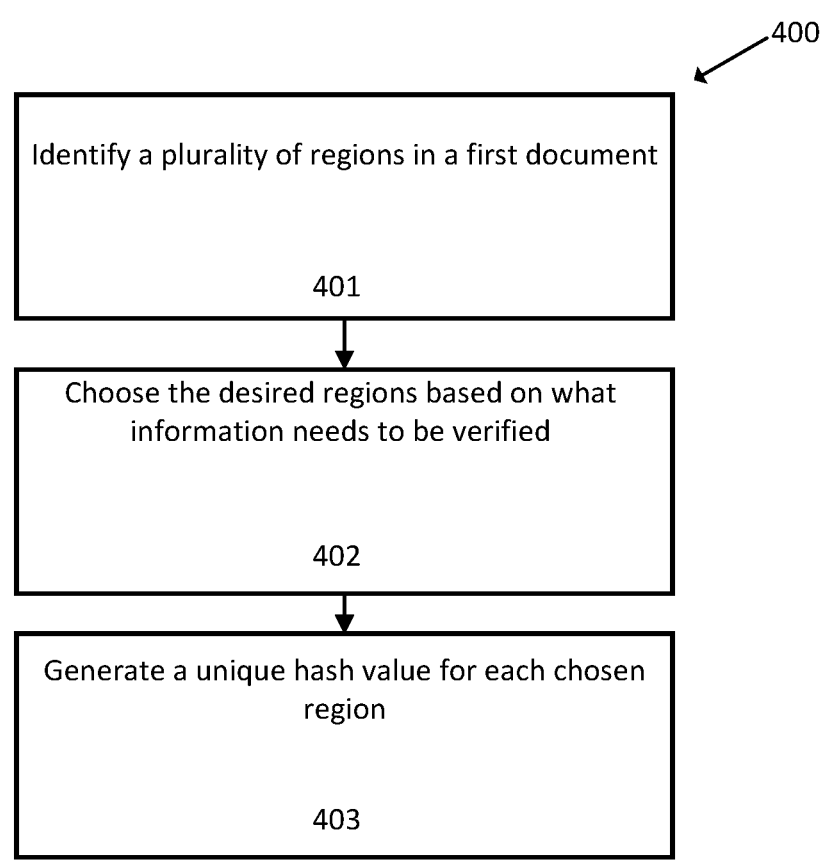
FIG. 4 illustrates an example of a hashing process used for verifying documents.

FIG. 4 shows a more detailed example of a process, performable by the server 105, by which a document 400 can be hashed to verify its contents. At step 401, the server 105 identifies a plurality of regions in the document based on the type of information in each region. The server parses the document into the plurality of regions so that each region can be hashed individually. For example, the server can determine what the different regions are by performing an optical character recognition scan of the document. The optical character recognition scan of the document determines each region based on what type of information is found in each region. The optical character recognition scan can determine the information type by looking for markers that are common to each type of information. For example, a common marker for an address can be a known state abbreviation such as "CA" for California followed by a five-digit numeric zip code. Additionally, by performing an optical character recognition scan the document can be verified even if the two documents are not identical. Two non-identical documents can both contain the same desired information even though they are formatted differently. For example, a pay stub and a bank statement may look very different, but both documents can contain the same information that would generate identical hash values for each corresponding region.

At step 402 the plurality of regions to be hashed are chosen. An example of a document with specific identified regions is discussed further below in relation to FIG. 5. In some embodiments, the plurality of regions are chosen automatically based on the type of document that is being verified. For example, if the document is a bank statement the server 105 can automatically detect which regions contain certain desirable information such as addresses, names, bank account numbers, and a bank account balance. In another embodiment, the plurality of regions are chosen by the document originator in advance, e.g., when the original document is uploaded. For example, the document originator decides which regions contain the desired information. The document originator then can limit what regions are hashed, which ultimately limits what information is able to be verified.

At step 403 a hashing algorithm generates a unique hash value for each of the plurality of regions, based on text and/or metadata in each of those respective regions. In some embodiments, the same hashing algorithm is used to generate the hash value of each region. In another embodiment, a different hashing algorithm is used for each region.

Figure 5:
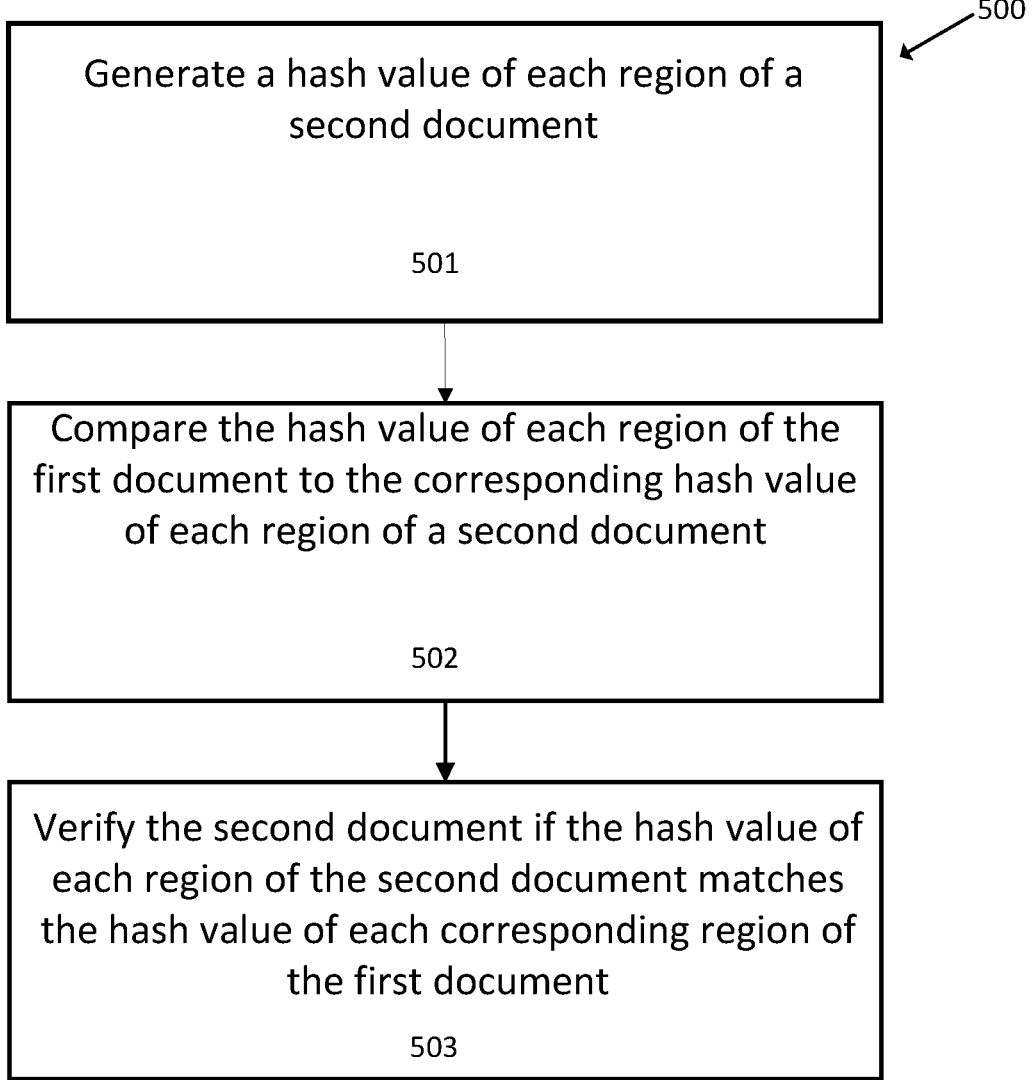
FIG. 5 illustrates an example of the verification process for a document divided into a plurality of regions.

FIG. 5 shows a more detailed example 500 of how a second document is verified against the first document of FIG. 4. At step 501 the same process described in FIG. 4 for a first document can be repeated for the second document. The second document is parsed into a plurality of regions and a hash value is generated for each of the plurality of regions. At step 502 the hash value of each region of the first document is compared to the corresponding hash values of each region of a second document. The hash values that are compared are generated from the same type of information. For example, the hash values being compared would both correspond to addresses, social security numbers, or salary information, respectively.

In step 503 the server verifies that the hash values being compared match for each of the identified plurality of regions. If the corresponding hash values from each region match between the two documents, then the information found in the documents also matches, and the second document is thus deemed to have passed the verification process. If none of the corresponding hash values from each region matches, then the information found in the documents does not match, and the second document is thus deemed to have failed the verification process. In situations where one or more pairs of corresponding hash values match and at least one pair of corresponding hash values does not, the server may deem the regions where the hash values match as passing the verification process and deem the regions where the hash values do not match as failing the verification process. For example, if the hash values for the regions corresponding to a social security number or an employee name match then the server will deem these regions as having passed the verification process, but if the hash values for the regions corresponding to an income amount or address do not match then the server will deem those regions as having failed the verification process. In other embodiments, the server may deem the entire document as having failed the verification process if the corresponding hash values for any portion of the document do not match.

When the server outputs the results of the verification process, the verification requestor can be notified about which regions and the subsequent information passed the verification process and which regions and information did not pass the verification process. By returning the results individually for each region the verification requestor can determine which information needs to be re-requested and subsequently reverified.

Figure 6:
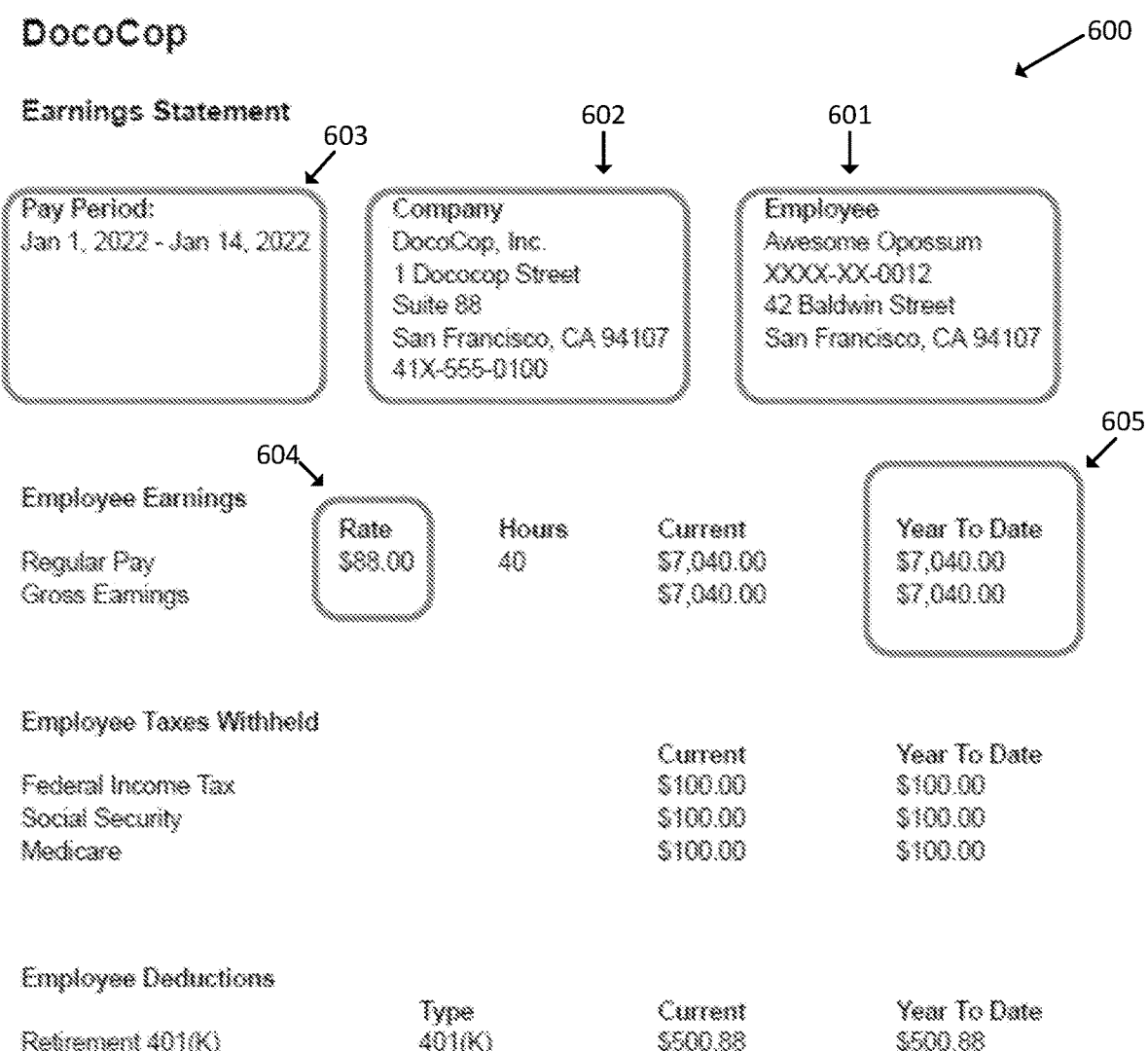
FIG. 6 illustrates an example of a document divided into a plurality of regions.

FIG. 6 illustrates an example of how a paystub document 600 can be parsed into different regions to facilitate verification of specific information. A typical pay stub contains various information that consistently needs to be verified by different entities such as landlords or banks. For example, region 601 contains the employee's name, phone number, and address. Region 602 contains the employer's name, phone number, and address. Region 603 contains the pay period and pay date for the pay stub. Region 604 contains the employee's pay rate per hour. Region 605 contains how much money the employee has made this year to date. For the illustrated paystub document, an entity named Dococop™ would be considered the document originator, because Dococop™ created the document and issued it to the employee identified in region 601. In some embodiments, Dococop™ would define each of the regions. In another embodiment, the server would automatically determine what the desired regions should be.

Figure 7:
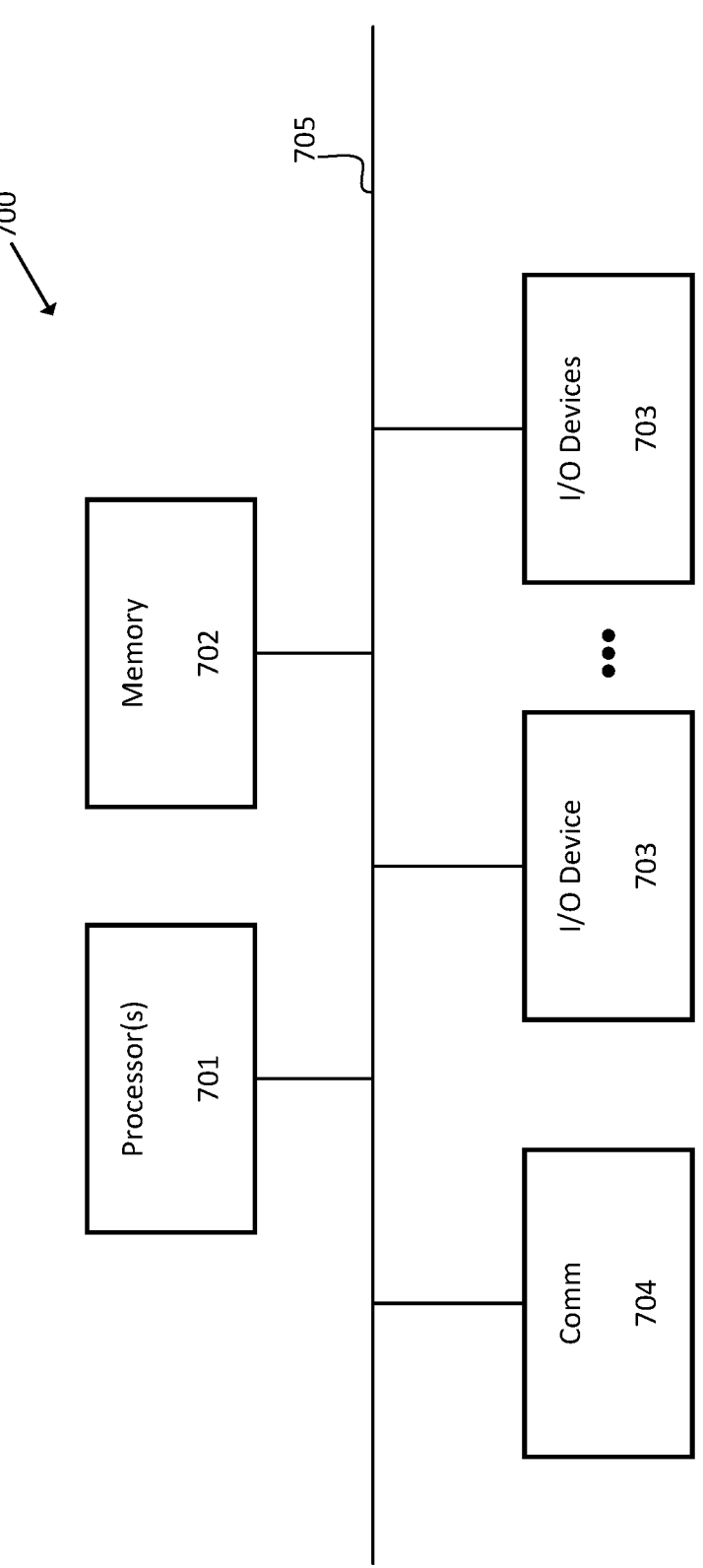
FIG. 7 is a high-level block diagram of a computer system.

FIG. 7 is a high-level block diagram of a computer system in which at least a portion of the technique introduced above can be implemented. The computer system 700 includes one or more processors 701, one or more memories 702, one or more input/out (I/O) devices 703, and one or more communication interfaces 704, all connected to each other through an interconnect 705. The processors 701 control the overall operation of the computer system 700, including controlling its constituent components. The processors 701 may be or include one or more conventional microprocessors (e.g., one or more central processing units (CPUs) and/or graphics processing unit (GPUs)), programmable logic devices (PLDs), field programmable gate arrays (FPGAs), application-specific integrated circuits (ASICs), hardware specific to hash generation, etc. The one or more memories 702 stores data and executable instructions (e.g., software and/or firmware), which may include software and/or firmware for performing the techniques introduced above. The one or more memories 702 may be or include any of various forms of random-access memory (RAM), read-only memory (ROM), volatile memory, nonvolatile memory, or any combination thereof. For example, the one or more memories 702 may be or include dynamic RAM (DRAM), static RAM (SDRAM), flash memory, one or more solid-state drives, disk-based hard drives, etc. The I/O devices 703 provide access to the computer system 700 by a human user, and may be or include, for example, a display monitor, audio speaker, keyboard, touch screen, mouse, microphone, trackball, biometric hardware such as fingerprint scanner, face scanner, retina scanner, etc. The communications interface 704 enables the computer system 700 to communicate with one or more external devices via a network connection and/or point-to-point connection. The communications interface 704 may be or include, for example, a Wi-Fi adapter, Bluetooth adapter, Ethernet adapter, Universal Serial Bus (USB) adapter, or the like. The interconnect 705 may be or include, for example, one or more buses, bridges, or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A method comprising:
recognizing a first type of information and a second type of information in a first document respectively based on a first information type marker and a second information type marker being present in the first document;
recognizing the first type of information and the second type of information in a second document respectively based on the first information type marker and the second information type marker being present in the second document;
determining, for each of the first document and the second document, a document type of a plurality of document types;
identifying, in each of the first document and the second document, a plurality of regions, wherein a first region of the plurality of regions is identified based on the first information type marker being present in the first region and based on the determined document type of the plurality of document types, and wherein a second region of the plurality of regions is identified based on the second information type marker being present in the second region and based on the determined document type of the plurality of document types;
generating a unique hash value for each of the plurality of regions of the first document and the second document, wherein the unique hash value for any of the plurality of regions is based on text or metadata associated with said any of the plurality of regions, wherein the text or metadata belong to the first type of information or the second type of information, and wherein a different one of a plurality of hashing algorithms is used to generate the unique hash value for each one of the plurality of regions;
comparing all hash values of the plurality of regions of the second document to all hash values of the plurality of regions of the first document;
based on the comparison, generating an indication of a verification status of the second document;
storing a hash value of the region of the first document and a hash value of the region of the second document in a database; and
creating an index of the hash value of the region of the first document and the hash value of the region of the second document.

2. The method of claim 1, wherein the first document and the second document are digital documents.

3. The method of claim 1, wherein an optical character recognition scan identifies the plurality of regions in each of the first document and the second document.

4. The method of claim 1, further comprising:
notifying a verification requestor of a result of a verification process, wherein the verification requestor is notified about which of the plurality of regions passed the verification process.

5. The method of claim 1 further comprising:
storing the unique hash values for each region in a database; and
creating an index of the unique hash values.

6. The method of claim 5 further comprising:
searching for the unique hash values in the database based on the index of the unique hash values.

7. The method of claim 1 further comprising:
generating the hash values of each region of the first document from an optical character recognition scan of the first document; and
generating the hash values of each region of the second document from an optical character recognition scan of the second document.

8. A method comprising:
receiving a first document and a second document, wherein the first document is received from a document originator and the second document is received from a verification requestor;
recognizing a first type of information and a second type of information in the first document respectively based on a first information type marker and a second information type marker being present in the first document;
recognizing the first type of information and the second type of information in the second document respectively based on the first information type marker and the second information type marker being present in the second document;
determining, for each of the first document and the second document, a document type of a plurality of document types;
identifying, in each of the first document and the second document, a plurality of regions,
wherein a first region of the plurality of regions is identified based on the document type and based on the first information type marker being present in the first region, and
wherein a second region of the plurality of regions is identified based on the document type and based on the second information type marker being present in the second region;
generating a unique hash value for each of the plurality of regions in each of the first document and the second document, wherein the unique hash value for any of the plurality of regions is based on text or metadata associated with said any of the plurality of regions, wherein the text or metadata belong to the first type of information or the second type of information, and wherein a different one of a plurality of hashing algorithms is used to generate the unique hash value for each one of the plurality of regions;

comparing the unique hash values for each of the plurality of regions of the second document to the unique hash value of each of the plurality of regions of the first document;

verifying the second document against the first document based on a result of the comparing of the unique hash values for each of the plurality of regions of the second document with the unique hash values for each of the plurality of regions of the first document, wherein the second document is deemed to have passed a verification process if the unique hash values for each of the plurality of regions of the second document are identical to the unique hash values for each of the plurality of regions of the first document;

storing a hash value of the region of the first document and a hash value of the region of the second document in a database; and creating an index of the hash value of the region of the first document and the hash value of the region of the second document.

9. The method of claim 8, wherein the first document and the second document are digital documents.

10. The method of claim 8, wherein an optical character recognition scan identifies the plurality of regions in each of the first document and the second document.

11. The method of claim 8 further comprising:

storing the unique hash value from each of the plurality of regions of the first document and the second document in a database; and creating an index of each hash value.

12. The method of claim 11 further comprising:

searching for the unique hash values in the database based on the index of the hash values.

13. The method of claim 8 further comprising:

generating the hash values of each region of the first document from an optical character recognition scan of the first document; and generating the hash values of each region of the second document from an optical character recognition scan of the second document.

14. A system comprising:

a processor; and a memory including instructions, execution of which by the processor causes the system to:

recognize a first type of information and a second type of information in a first document respectively based on a first information type marker and a second information type marker being present in the first document;

recognize the first type of information and the second type of information in a second document respectively based on the first information type marker and the second information type marker being present in the second document;

determine, for each of the first document and the second document, a document type of a plurality of document types;

identify, in each of the first document and the second document, a plurality of regions, wherein a first region of the plurality of regions is identified based on the document type and based on the first information type marker being present in the first region, and wherein a second region of the plurality of regions is identified based on the document type and based on the second information type marker being present in the second region;

generate a unique hash value for each of the plurality of regions, wherein the unique hash value for any of the plurality of regions is based on text or metadata associated with said any of the plurality of regions, wherein the text or metadata belong to the first type of information or the second type of information, and wherein a different one of a plurality of hashing algorithms is used to generate the unique hash value for each one of the plurality of regions;

compare all hash values of the plurality of regions of the second document to all hash values of the plurality of regions of the first document;

based on the comparison, generate an indication of a verification status of the second document;

store a hash value of the region of the first document and a hash value of the region of the second document in a database; and create an index of the hash value of the region of the first document and the hash value of the region of the second document.

15. The system of claim 14, wherein the first document and the second document are digital documents.

16. The system of claim 14, wherein an optical character recognition scan identifies the plurality of regions in each of the first document and the second document.

17. The system of claim 14, further comprising:

notify a verification requestor of a result of a verification process, wherein the verification requestor is notified about which of the plurality of regions passed the verification process.

18. The system of claim 14 further comprising: search for the unique hash values in the database based on the index of the unique hash values.

19. The system of claim 14 further comprising:

generate the hash values of each region of the first document from an optical character recognition scan of the first document; and generate the hash values of each region of the second document from an optical character recognition scan of the second document.

* * * * *